(12) United States Patent
Nakamura et al.

(10) Patent No.: US 6,689,818 B2
(45) Date of Patent: Feb. 10, 2004

(54) DISPERSANT COMPOSITIONS

(75) Inventors: Norio Nakamura, Takefu (JP); Shuichiro Shinohara, Takefu (JP)

(73) Assignee: Nissin Chemical Industry Co., Ltd., Fukui-ken (JP)

( * ) Notice: Subject to any disclaimer, the term of this patent is extended or adjusted under 35 U.S.C. 154(b) by 0 days.

(21) Appl. No.: 10/230,350

(22) Filed: Aug. 29, 2002

(65) Prior Publication Data
US 2003/0125393 A1 Jul. 3, 2003

(30) Foreign Application Priority Data

Nov. 26, 2001 (JP) ........................................ 2001-359244

(51) Int. Cl.$^7$ ........................... B01F 3/12; C04B 24/02; C04B 24/26
(52) U.S. Cl. ........................... 516/78; 516/79; 516/134; 516/917; 516/919; 524/4; 524/5; 106/802; 106/823
(58) Field of Search ............................ 516/78, 93, 917, 516/919, 79, 134; 524/4, 5; 106/802, 823

(56) References Cited

U.S. PATENT DOCUMENTS

| | | | | |
|---|---|---|---|---|
| 4,948,429 A | * | 8/1990 | Arfaei | ........................ 106/659 |
| 5,478,521 A | * | 12/1995 | Scheiner | ..................... 106/802 |
| 5,736,600 A | * | 4/1998 | Karkare et al. | ............. 106/802 |
| 6,310,143 B1 | * | 10/2001 | Vickers et al. | ................ 516/93 |
| 6,441,054 B1 | * | 8/2002 | Ou et al. | ...................... 516/77 |

FOREIGN PATENT DOCUMENTS

| | | |
|---|---|---|
| JP | 60-180955 | 9/1995 |
| WO | WO 01/42161 A2 * | 6/2001 |

* cited by examiner

Primary Examiner—Daniel S. Metzmaier
(74) Attorney, Agent, or Firm—Birch, Stewart, Kolasch & Birch, LLP

(57) ABSTRACT

A dispersant composition comprising (A) 20–80% by weight of an acetylene glycol or ethoxylated acetylene glycol and (B) 20–80% by weight of a graft product of an allyl alcohol-maleic anhydride-styrene copolymer with a polyoxyalkylene monoalkyl ether, comprising (a) polyoxyalkylene monoalkyl ether units, (b) maleic anhydride units, and (c) styrene units, in a compositional ratio a:b:c of 25–40:25–40:25–40 in mole percent, and having a $\overline{\text{Mw}}$ of 1,000–50,000 exerts improved dispersing, anti-foaming and viscosity-reducing effects, when used in small amounts in dispersing of inorganic particulates.

2 Claims, No Drawings

DISPERSANT COMPOSITIONS

This invention relates to dispersant compositions, and more particularly, to dispersant compositions which exert improved dispersing, anti-foaming and viscosity-reducing effects when added in small amounts in dispersing inorganic particulates such as ceramic particulates (e.g., alumina, ferrite) and calcium carbonate.

BACKGROUND OF THE INVENTION

Prior art methods of forming ceramic sheets involve dissolving a binder such as polyvinyl butyral resin in an organic solvent, admixing a finely divided ceramic raw material in the solution, and milling the mixture in a ball mill or suitable mixer for a long time for dispersion. After defoaming, the dispersion is applied to a film support of polyester or the like to a certain thickness to form a green sheet, which is fired.

Because of the flammability and environmental problems of organic solvents, it was recently proposed to use aqueous binders to avoid the use of organic solvents. Water-soluble binders including polyvinyl alcohol and water-soluble polyurethane were developed as disclosed in JP-A 60-180955. They have found more frequent use.

Often a slurry is prepared by dispersing ceramic powder in water and blending a water-soluble binder therein. In the process of preparing a powder slurry, it is crucial to control the dispersion of fine particles. The quality of finished ceramic articles is largely affected by the degree of dispersion of fine particles. Then a choice of a dispersant is very important.

Nevertheless, aqueous binders raise problems due to their high surface tension. When ceramic particles are dispersed, the penetration of the binder or dispersant is retarded so that the ceramic particles will agglomerate together, or even when they are dispersed, the resulting slurry has a high viscosity which causes uneven coating when the slurry is applied. Emulsifiers or water-soluble polymers in the aqueous binders cause the slurry to generate foams, which reveal themselves as pinholes in articles formed from the slurry. As a result, the formed articles are very weak.

Under the circumstances, polyacrylic acid and ammonium salts of β-naphthalenesulfonic acid-formaldehyde condensates are often used as the dispersant. For certain types of powder, some dispersants are ineffective, and some have dispersing effects, but the dispersed slurry increases its viscosity with the passage of time. After a certain time has passed since the initial dispersion, the slurry cannot be dispersed again, that is, becomes unusable.

More recently proposed replacement dispersants are interdigital polymers such as graft products of allyl alcohol-maleic anhydride-styrene polymers with polyoxyalkylene monoalkyl ether. They have good dispersing effects and change little with time, but have so high a foaming ability that formed ceramic bodies have many pinholes and are very weak. This necessitates the combined use of anti-foaming agents.

The anti-foaming agents used in the art are mineral oil and silicone base agents. The mineral oil base agents are relatively low repellent, but lack retention and water solubility. Their safety problem becomes a concern in these days. On the other hand, the silicone base anti-foaming agents have good and long-lasting anti-foaming effects, but have the shortcomings of high repellency, formation of craters, and an increased rate of defectives. The addition amount is thus limited.

When such an anti-foaming agent is used to prevent pinholes, repellency is developed due to poor compatibility. In green sheets formed from such slurries, the development of craters presumably resulting from repellency is a problem.

Under the circumstances, it would be desirable in the electronic material art to have a dispersant which is compatible with aqueous binders without a need for anti-foaming agents, that is, has minimized foaming ability, viscosity-reducing effects, and good dispersing effects, and experiences no change of viscosity with time.

SUMMARY OF THE INVENTION

An object of the invention is to provide a dispersant composition which exerts improved dispersing, anti-foaming and viscosity-reducing effects when added in dispersing inorganic particulates such as ceramic particulates and calcium carbonate and which experiences little change with time.

We have found that a dispersant composition comprising a specific acetylene glycol and a graft product of an allyl alcohol-maleic anhydride-styrene copolymer with a polyoxyalkylene monoalkyl ether is compatible with aqueous ceramic binders, has improved dispersing and viscosity-reducing effects, experiences little change with time, and has minimized foaming ability. Using this dispersant composition, the above-discussed problems of the prior art are overcome.

According to the invention, there is provided a dispersant composition comprising (A) 20 to 80% by weight of at least one acetylene glycol selected from acetylene glycols of the formula (1):

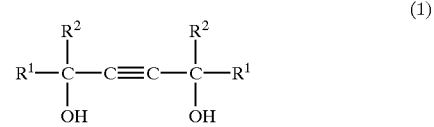

wherein $R^1$ and $R^2$ each are a $C_{1-5}$ alkyl group, and ethoxylated acetylene glycols of the formula (2):

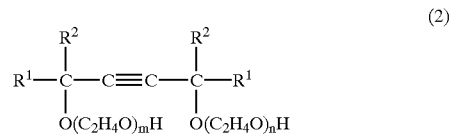

wherein $R^1$ and $R^2$ each are a $C_{1-5}$ alkyl group, m and n each are a positive number of 0.5 to 25, and m+n is 1 to 40, and (B) 20 to 80% by weight of a graft product of an allyl alcohol-maleic anhydride-styrene copolymer with a polyoxyalkylene monoalkyl ether, comprising (a) polyoxyalkylene monoalkyl ether units of the formula (3):

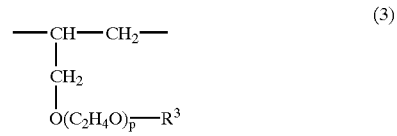

wherein $R^3$ is a $C_{1-5}$ alkyl group and p is a positive number of 5 to 50, (b) maleic anhydride units, and (c) styrene units, in a compositional ratio a:b:c of 25-40:25-40:25-40 in mole percent, the graft product having a weight average molecular weight ($\overline{Mw}$) of 1,000 to 50,000.

DESCRIPTION OF THE PREFERRED EMBODIMENTS

Component (A) in the dispersant composition of the invention is at least one acetylene glycol selected from acetylene glycols of the formula (1) and ethoxylated acetylene glycols of the formula (2).

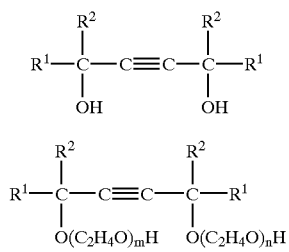

Herein $R^1$ and $R^2$ each are a $C_{1-5}$ alkyl group, m and n each are a positive number of 0.5 to 25, and m+n is 1 to 40.

Examples of the acetylene glycol having formula (1) include 2,5,8,11-tetramethyl-6-dodecyne-5,8-diol,
5,8-dimethyl-6-dodecyne-5,8-diol,
2,4,7,9-tetramethyl-5-decyne-4,7-diol,
4,7-dimethyl-5-decyne-4,7-diol,
2,3,6,7-tetramethyl-4-octyne-3,6-diol,
3,6-dimethyl-4-octyne-3,6-diol, and
2,5-dimethyl-3-hexyne-2,5-diol.

Examples of the ethoxylated acetylene glycol having formula (2) include ethylene oxide derivatives of the above-exemplified acetylene glycols, such as ethoxylated 2,4,7,9-tetramethyl-5-decyne-4,7-diol (molar number of ethylene oxide added 10 moles), ethoxylated 2,4,7,9-tetramethyl-5-decyne-4,7-diol (molar number of ethylene oxide added 4 moles), ethoxylated 3,6-dimethyl-4-octyne-3,6-diol (molar number of ethylene oxide added 4 moles), and ethoxylated 2,5,8,11-tetramethyl-6-dodecyne-5,8-diol (molar number of ethylene oxide added 6 moles).

The molar number of ethylene oxide units added to the acetylene glycol on each side is 0.5 to 25 moles, and the total molar number of addition is 1 to 40 moles. If the total molar number of ethylene oxide added exceeds 40 moles, the foaming ability increases, resulting in formed articles having pinholes and lacking strength.

The acetylene glycols (A) may be used alone or in admixture of two or more. When the dispersant composition of the invention is prepared, the acetylene glycol (A) is used in an amount of 20 to 80% by weight, preferably 30 to 60% by weight of the entire composition. A composition with more than 80% by weight of the acetylene glycol is low in dissolving power, allowing repellency (craters) to occur when ceramic sheets are formed. A composition with less than 20% by weight of the acetylene glycol has less anti-foaming effects, allowing for foaming, which results in pinholes.

In the dispersant composition of the invention, the acetylene glycol (A) is compounded with a graft product of an allyl alcohol-maleic anhydride-styrene copolymer with a polyoxyalkylene monoalkyl ether, designated as component (B). The graft product (B) is constructed from (a) polyoxyalkylene monoalkyl ether units of the formula (3), (b) maleic anhydride units, and (c) styrene units.

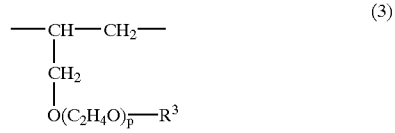

Herein $R^3$ is a $C_{1-5}$ alkyl group and p is a positive number of 5 to 50.

The compositional ratio of a:b:c is 25–40:25–40: 25–40 in mole percent. If the proportions of the maleic anhydride units (b) and the styrene units (c) relative to the polyoxyalkylene monoalkyl ether units (a) are higher or lower than this range, undesirably dispersing effects lower.

Examples of the graft product of allyl alcohol-maleic anhydride-styrene copolymer with polyoxyalkylene monoalkyl ether (B) are given below. These graft products may be used alone or in admixture of two or more.

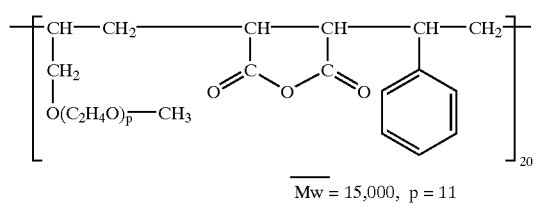

Mw = 15,000, p = 11

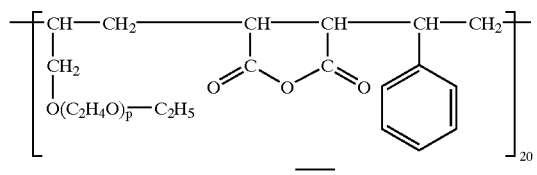

Mw = 30,000, p = 28

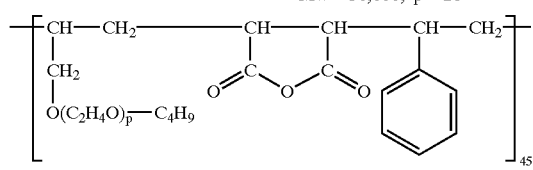

Mw = 40,000, p = 13

The molar number of ethylene oxide units added in component (B), represented by p in formula (3), is 5 to 50 moles. With more than 50 moles of ethylene oxide units, dispersing effects increase, but substantial foaming effects are exerted, that is, good viscosity-reducing effects are lost. With less than 5 moles of ethylene oxide units, water solubility becomes short and dispersing effects are lost.

Component (B) should have a weight average molecular weight ($\overline{Mw}$) of 1,000 to 50,000. With $\overline{Mw}$>50,000, a remarkably high viscosity might develop upon dissolution, and the resulting dispersion might be difficult to apply. With $\overline{Mw}$<1,000, dissolving power lowers, failing to achieve satisfactory dispersing effects.

When the dispersant composition of the invention is prepared, component (B) is used in an amount of 20 to 80% by weight, preferably 30 to 70% by weight of the entire composition. A composition with more than 80% by weight of component (B) can have an enhanced foaming ability which results in pinholes, and becomes so hydrophilic that the film strength of a binder itself may be affected at a certain humidity. A composition with less than 20% by weight of component (B) has less dispersing effects and allows agglomerates to form during the ceramic dispersing step, impeding application.

In the practice of the invention, components (A) and (B) are combined so as to provide a total of 100% by weight. However, it is acceptable to blend components (A) and (B) with a third component or component (C). Such third components include deionized water; water-soluble organic solvents such as ethylene glycol, diethylene glycol, triethylene glycol, tetraethylene glycol, polyethylene glycol, propylene glycol, dipropylene glycol, 1,3-propane diol, 1,4-butane diol, and glycerin; and optionally, solubilizing agents such as polyoxyethylene alkyl phenyl ethers, polyoxyethylene alkyl ethers, and polyoxy(ethylene-propylene) block polymers.

The third component may be used in an amount of 0 to 25% by weight, preferably 5 to 10% by weight of the entire composition as long as it does not compromise the desired properties of the dispersant composition.

The dispersant composition of the invention is obtained, for example, by mixing the above-mentioned components by a well-known mixing method, typically in a propeller mixer. If any component is solid at room temperature, it is optionally heated before mixing.

A ceramic forming slurry is prepared by dispersing an inorganic powder and a binder in water with the aid of the dispersant composition of the invention. The dispersant composition is desirably used in an amount of 0.05 to 10% by weight, more desirably 0.05 to 5% by weight based on the entire slurry.

Any desired inorganic powder is used in the slurry. Examples of the inorganic powder include fine particulate oxide and compound oxide family ceramics such as alumina, silica, zirconia, magnesium, beryllia, titania, barium titanate, lead titanate zirconate, and ferrite-manganese; fine particulate non-oxide family ceramics such as silicon carbide, silicon nitride and Sialon; silicates such as kaolin, aluminum silicate, clay, talc, mica, asbestos, calcium silicate, sericite and bentonite; carbonates such as calcium carbonate, magnesium carbonate, barium carbonate and dolomite; sulfates such as calcium sulfate and barium sulfate; metal oxides such as magnesia, antimony trioxide, antimony pentoxide, white carbon, diatomaceous earth and iron oxide; and metal hydroxides such as aluminum hydroxide, magnesium hydroxide and iron hydroxide.

Examples of suitable binder include polyvinyl alcohol; cellulose derivatives such as carboxymethyl cellulose and hydroxymethyl cellulose; maleic anhydride resin; conjugated diene copolymer latexes such as conventional styrene-butadiene copolymers and methyl methacrylate-butadiene copolymers; acrylic copolymer latexes such as acrylate and methacrylate copolymers; and vinyl polymer latexes such as ethylene-vinyl acetate copolymers.

EXAMPLE

Examples of the invention are given below by way of illustration and not by way of limitation. All parts and percents are by weight.

Example 1

In a vessel equipped with a propeller mixer, 40 parts of 2,4,7,9-tetramethyl-5-decyne-4,7-diol (trade name Surfynol 104, by Air Products and Chemicals) heated at 50° C. was admitted. With agitation, 60 parts of a graft product of allyl alcohol-maleic anhydride-styrene copolymer with polyoxyalkylene monoalkyl ether (trade name Malialim AKM-0531, $\overline{\text{Mw}}$ 15,000, by NOF Corp.) was slowly added and mixed. After 2 hours of continuous agitation, the contents were cooled down to room temperature. On cooling and filtration through a 200-mesh filter fabric, a dispersant composition designated PD-1 was obtained.

To 56 parts of deionized water was added 5 parts of dispersant composition PD-1. This was agitated for dissolution by operating a disper at 1,000 rpm, after which 200 parts of alumina (AL-160SG-3, average particle size 0.6 μm, by Showa Denko K.K.) was added and dispersed by agitating at 3,000 rpm for 10 minutes. Subsequently, 80 parts of a 20% PVA-205 aqueous solution was added. Agitation for a further 30 minutes yielded a ceramic forming slurry.

The ceramic forming slurry was applied onto a Mylar film by means of a doctor blade so as to give a dry coating thickness of 30 μm, dried at 45° C. for 2 hours and at 80° C. for one hour, obtaining a green sheet. During the process, dispersibility, anti-foaming and forming properties were examined, and the strength and elongation of the green sheet were measured. The results are shown in Table 2.

These properties were examined by the following tests.

1) Dispersibility

The ceramic forming slurry obtained by the above process was measured for viscosity both immediately after dispersion and after two days of holding. The slurry was applied onto a glass plate using a 6-mil doctor knife, whereupon the presence of agglomerates was visually inspected.

O: no agglomerates

X: agglomerates found

2) Anti-Foaming Property

A slurry dilution was prepared by diluting the ceramic forming slurry with deionized water in a weight ratio of 1/9. This sample, 20 ml, was admitted into a 100-ml measuring cylinder, which was shaken by a shaker at 180 strokes per minute. The volume (ml) of foams was measured both at the end of shaking and after 5 minutes of holding.

3) Forming Property (Craters)

The surface state of the ceramic green sheet before drying was observed under a digital microscope for judging whether or not craters were present.

O: no craters

X: craters found

4) Strength and Elongation of Green Sheet

The strength and elongation of the green sheet were measured by the tensile strength test of JIS K7113.

Examples 2–5 & Comparative Examples 1–6

Dispersant compositions, designated PD-2 to PD-11, were prepared as in Example 1, by agitating and mixing respective components the type and amount (%) of which are shown in Table 1. The type and amount of respective components in Example 1 are also shown in Table 1.

As in Example 1, ceramic forming slurries were prepared using the dispersant compositions PD-2 to PD-11, and green sheets were prepared using the slurries. During the process, the slurries and green sheets were tested as in Example 1.

The results are also shown in Table 2.

TABLE 1

| Dispersant composition [Content (wt %)] | | Example | | | | | Comparative Example | | | | | |
|---|---|---|---|---|---|---|---|---|---|---|---|---|
| | | 1 PD-1 | 2 PD-2 | 3 PD-3 | 4 PD-4 | 5 PD-5 | 1 PD-6 | 2 PD-7 | 3 PD-8 | 4 PD-9 | 5 PD-10 | 6 PD-11 |
| Component A | A-1 | 40 | | | | 30 | 85 | | | 65 | | |
| | A-2 | | 60 | | | | | 10 | | | 35 | |
| | A-3 | | | 25 | | 30 | | | | | | |
| | A-4 | | | 25 | 70 | | | | | | | |
| | A-5 | | | | | | | | 45 | | | |
| Component B | B-1 | 60 | | | 25 | 35 | 15 | | 50 | | | 100 |
| | B-2 | | 35 | | | | | 85 | | | | |
| | B-3 | | | 40 | | | | | | | | |
| | B-4 | | | | | | | | | 30 | | |
| | B-5 | | | | | | | | | | 55 | |
| Component C | C-1 | | 5 | 5 | | | | 5 | | | | |
| | C-2 | | | 5 | | | | | 5 | | | |
| | C-3 | | | | 5 | | | | | 5 | | |
| | C-4 | | | | | 5 | | | | | 10 | |

Component A

A-1: 2,4,7,9-tetramethyl-5-decyne-4,7-diol (trade name Surfynol 104, Air Products and Chemicals)

A-2: 3,6-dimethyl-4-octyne-3,6-diol (trade name Surfynol 82, Air Products and Chemicals)

A-3: 2,5,8,11-tetramethyl-6-dodecyne-5,8-diol (trade name Surfynol DF-110, Air Products and Chemicals)

A-4: ethoxylated 2,4,7,9-tetramethyl-5-decyne-4,7-diol (trade name Surfynol 465, Air Products and Chemicals, molar number of ethylene oxide added: 10)

A-5: ethoxylated 2,4,7,9-tetramethyl-5-decyne-4,7-diol (molar number of ethylene oxide added: 50)

Component B

B-1:

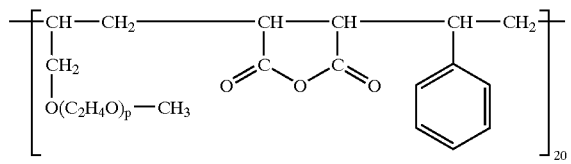

(trade name Malialim AKM-0531, NOF Corp., $\overline{Mw}$ = 15,000, P = 11)

B-2:

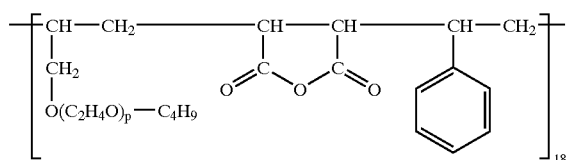

(trade name Malialim AAB-0851, NOF Corp., $\overline{Mw}$ = 40,000, P = 13)

B-3:

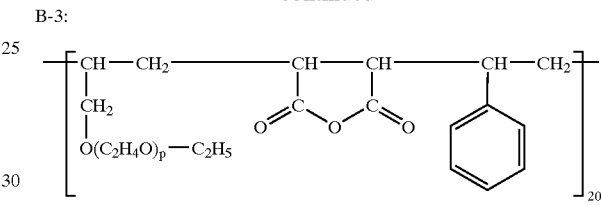

(trade name Malialim AFB-1521, NOF Corp., $\overline{Mw}$ = 30,000, P = 28)

B-4:

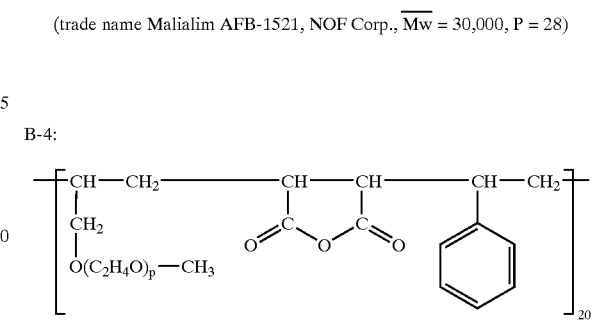

($\overline{Mw}$ = 55,000, P = 55)

B-5:

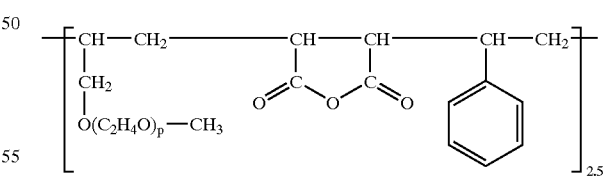

($\overline{Mw}$ = 900, P = 2)

Component C

C-1: ethylene glycol
C-2: propylene glycol
C-3: polyethylene glycol
C-4: glycerin

Comparative Examples 7–9

Using commercially available dispersants, the same procedure as in Example 1 was repeated and the same tests carried out. The results are also shown in Table 2.

Commercial product 1: polyvinyl pyrrolidone (trade name PX-K30P, Nippon Shokubai Co., Ltd.)
Commercial product 2: β-naphthalene sulfonic acid-formaldehyde condensate (trade name Tamol NNA4109, BASF AG)
Commercial product 3: polyacrylic acid (trade name PA80S, BASF AG)

TABLE 2

| Dispersant composition | | Example | | | | | Comparative Example | | |
|---|---|---|---|---|---|---|---|---|---|
| | | 1 PD-1 | 2 PD-2 | 3 PD-3 | 4 PD-4 | 5 PD-5 | 1 PD-6 | 2 PD-7 | 3 PD-8 |
| Dispersibility Viscosity ($\times 10^3$ mPa·s) | As dispersed | 1500 | 2500 | 3000 | 2800 | 3300 | 45000 | 30000 | 32000 |
| | After 2 days | 1540 | 2500 | 3100 | 2800 | 3200 | 52000 | 38000 | 35000 |
| Agglomerates | | ○ | ○ | ○ | ○ | ○ | X | X | X |
| Anti-foaming (ml) | After shaking | 10 | 5 | 8 | 7 | 4 | 5 | 30 | 33 |
| | After 5 minutes | 2 | 1 | 3 | 1 | 1 | 1 | 28 | 32 |
| Forming Green sheet | Craters | ○ | ○ | ○ | ○ | ○ | X | X | X |
| | Elongation (%) | 32 | 40 | 38 | 35 | 38 | 20 | 17 | 21 |
| | Strength (MPa) | 4.5 | 3.9 | 4.1 | 4.3 | 4.0 | 2.1 | 1.8 | 2.3 |

| Dispersant composition | | Comparative Example | | | | | |
|---|---|---|---|---|---|---|---|
| | | 4 PD-9 | 5 PD-10 | 6 PD-11 | 7 Commercial product-1 | 8 Commercial product-2 | 9 Commercial product-3 |
| Dispersibility Viscosity ($\times 10^3$ mPa·s) | As dispersed | 35000 | 38500 | 42000 | 39000 | 34000 | 39000 |
| | After 2 days | 41000 | 41500 | 45000 | 42000 | 38000 | 48000 |
| Agglomerates | | X | X | X | X | ○ | X |
| Anti-foaming (ml) | After shaking | 11 | 31 | 28 | 28 | 19 | 20 |
| | After 5 minutes | 9 | 30 | 27 | 26 | 18 | 20 |
| Forming Green sheet | Craters | X | X | X | X | X | X |
| | Elongation (%) | 23 | 19 | 18 | 14 | 17 | 16 |
| | Strength (MPa) | 1.9 | 1.7 | 2.1 | 2.3 | 2.0 | 1.7 |

The dispersant composition of the invention, when used in dispersing of inorganic particulates, exerts improved dispersing, anti-foaming and viscosity-reducing effects, even in small amounts. It is very advantageous in practical applications.

Japanese Patent Application No. 2001-359244 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:
1. A dispersant composition comprising

(A) 20 to 80% by weight of at least one acetylene glycol selected from acetylene glycols of the formula (1):

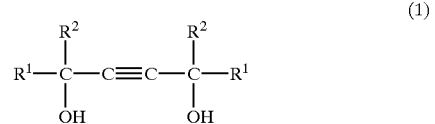

wherein $R^1$ and $R^2$ each are a $C_{1-5}$ alkyl group, and ethoxylated acetylene glycols of the formula (2):

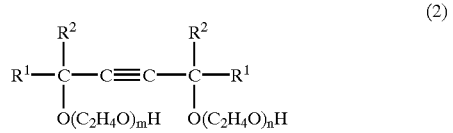

wherein $R^1$ and $R^2$ each are a $C_{1-5}$ alkyl group, m and n each are a positive number of 0.5 to 25, and m+n is 1 to 40, and (B) 20 to 80% by weight of a graft product of an allyl alcohol-maleic anhydride-styrene copolymer with a polyoxyalkylene monoalkyl ether, comprising (a) polyoxyalkylene monoalkyl ether units of the formula (3):

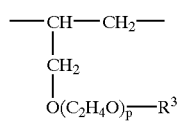

(3)

wherein $R^3$ is a $C_{1-5}$ alkyl group and p is a positive number of 5 to 50, (b) maleic anhydride units, and (c) styrene units, in a compositional ratio a:b:c of 25–40:25–40:25–40 in mole percent, the graft product having a weight average molecular weight of 1,000 to 50,000.

2. The dispersant composition of claim 1, further comprising a third component selected from the group consisting of deionized water, ethylene glycol, diethylene glycol, triethylene glycol, tetraethylene glycol, polyethylene glycol, propylene glycol, dipropylene glycol, 1,3-propane diol, 1,4-butane diol, and glycerin.

* * * * *